United States Patent [19]

Bunch

[11] 4,108,589
[45] Aug. 22, 1978

[54] TOOL FOR FLARING PLASTIC PIPE

[76] Inventor: Robert E. Bunch, 2754 Arrow Hwy., Sp. 22, LaVerne, Calif. 91750

[21] Appl. No.: 761,337

[22] Filed: Jan. 21, 1977

Related U.S. Application Data

[63] Continuation-in-part of Ser. No. 671,749, Mar. 30, 1976, abandoned.

[51] Int. Cl.$^2$ .............................................. B29C 17/02
[52] U.S. Cl. ...................................... 425/393; 72/317; 269/228; 269/268
[58] Field of Search ............... 269/228, 268, 126, 237; 24/132 WL, 248 E, 248 SA, 249 LS, 249 SL, 249 LL; 425/392–393, DIG. 41, 218; 72/317

[56] References Cited

U.S. PATENT DOCUMENTS

| 935,013 | 9/1909 | Gilcheist | 269/228 |
| 1,421,065 | 6/1922 | Callan | 269/228 |
| 3,584,344 | 6/1971 | Bjalme | 425/393 |
| 3,806,301 | 4/1974 | Osterhagen et al. | 425/393 |

OTHER PUBLICATIONS

Wespo Toggle Clamps; Catalog 7; received in U.S. Patent Office on 11/7/61; pp. 1, 4, and 5.

Primary Examiner—Francis S. Husar
Assistant Examiner—John McQuade
Attorney, Agent, or Firm—Boniard I. Brown

[57] ABSTRACT

A tool for flaring and doubling over the end of thermoplastic pipe and tubes wherein the tool includes a pair of superposed clamping bars, one being mounted to a stationary fixture and the other bar being hingedly connected at one end thereto. The hinged bar clamp is held in a clamped fixed position by a releasable toggle clamp device which is secured to the fixed bar clamp. Each bar is provided with a plurality of corresponding arcuate non-semicircular notches of various sizes to accommodate each particular sized pipe. A mandrel and flaring head which can be power driven, is also provided for flaring and doubling over the free end of the plastic tube or pipe when positioned within the clamping tool.

3 Claims, 13 Drawing Figures

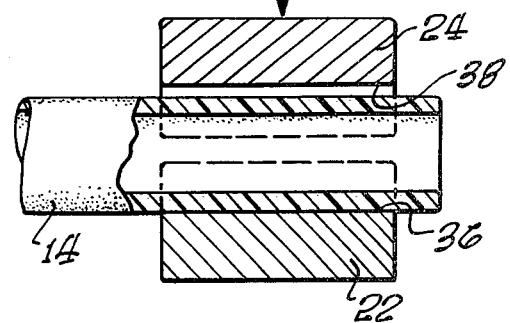
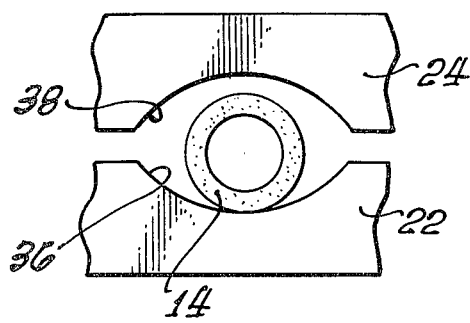
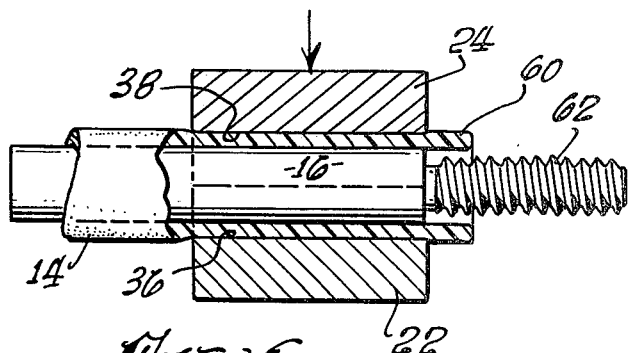
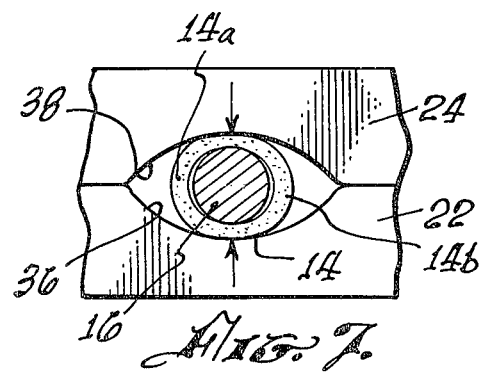
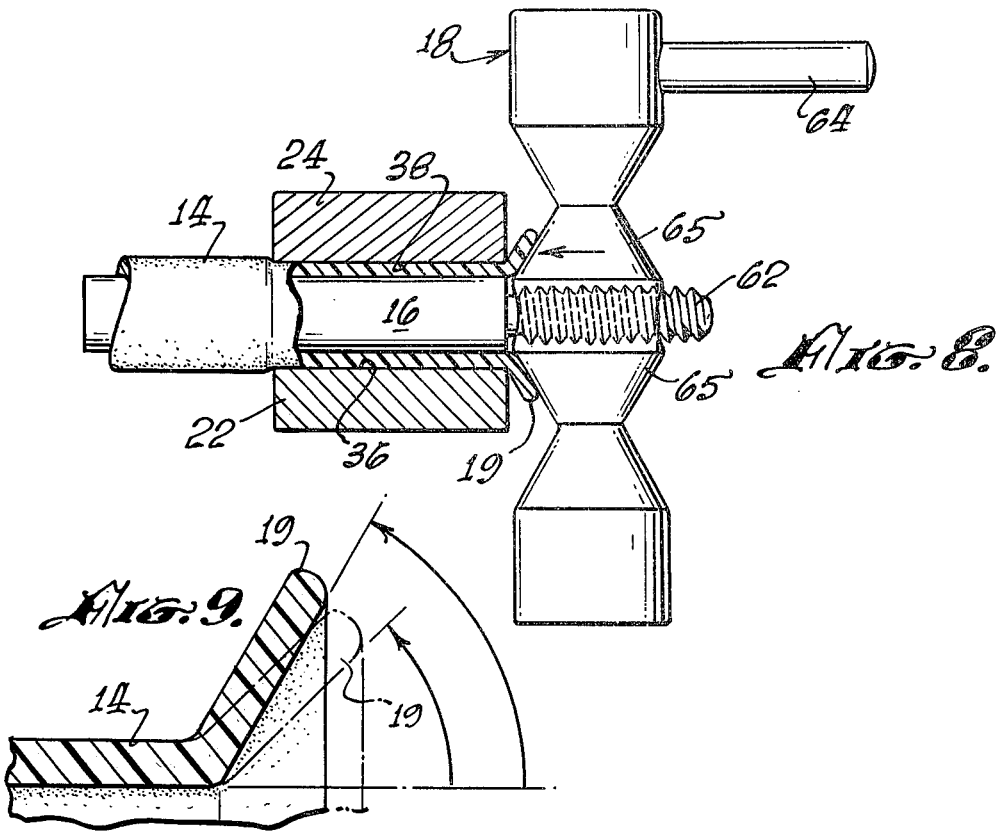

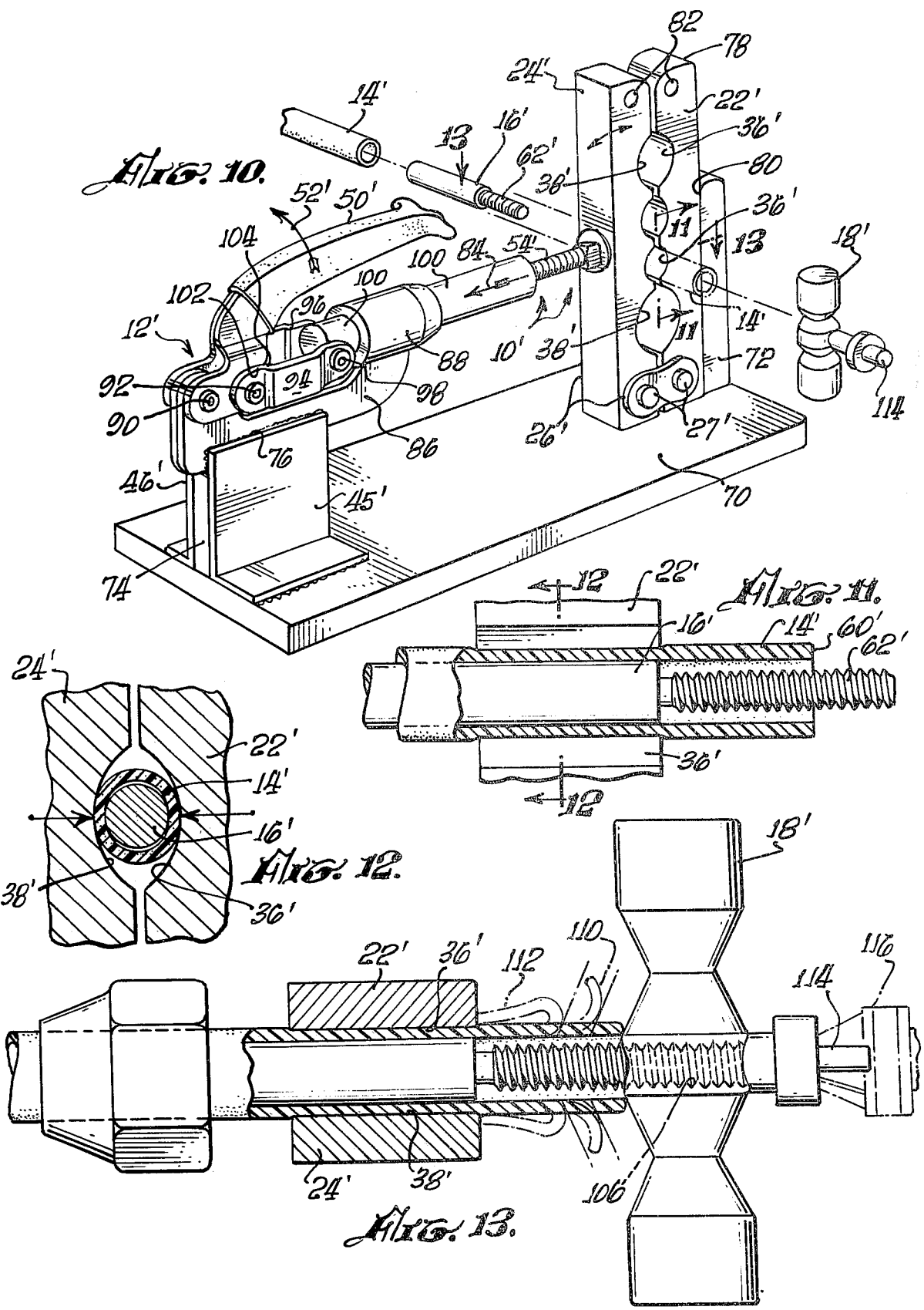

TOOL FOR FLARING PLASTIC PIPE

This application is a continuation-in-part of copending patent application Ser. No. 671,749, filed Mar. 30, 1976, now abandoned.

BACKGROUND OF THE INVENTION

1. Field of the Invention

This invention relates generally to a plastic pipe-flaring tool including a clamping device capable of holding one of various sized pipes during the flaring operation, without damage to the pipe.

2. Description of the Prior Art

As is well known in the art various types of flaring tools are presently available, however, several problems and difficulties are encountered in providing proper flaring under improper clamping of the pipe. That is, it has been found by pipe fitters, plumbers and like tradesmen that when the flaring process is completed, damage has occurred to the pipe end adjacent the flare. This damage can be in the form of a weak area or a small-split that is created generally by the clamping device.

Various clamping devices such as for example U.S. Pat. Nos. 3,585,687 and 3,601,852, are provided with circular notches wherein the plastic material when compressed, is forced to expand in the areas of lease resistance — that being the lateral spaces created on each of the notches which crimp and bruise the plastic as it is distorted from the forces of the circular clamping notches.

Thus, a tendency is created to avoid over-clamping of the pipe, to relieve the plastic distortion, by securing the pipe under less compressional force between the clamp jaws. However, this then provides a second problem — the flare can not be properly formed, as the mandrel within the pipe will both rotate therein or move longitudinally outwardly. Thus, a flare can not be made at the end of the pipe if the flaring head does not provide the needed inward force against the pipe end. This is especially true if it is desired to so deform the pipe end during the flaring operation that the end "doubles over," a desirable result when plastic pipes are to be connected.

Other clamping tools are known to incorporate angular notches, which also tends to crack the plastic, or cut into the material. Also some prior art hand operable clamping tools can not generate sufficient force to provide the desired retention of the pipe for doubling over operations.

SUMMARY OF THE INVENTION

This invention provides a device for flaring and doubling over the ends of thermoplastic pipe or tubing such as used for water service. A flare is created at the free ends of the pipe or tube on which a female connector fitting is adapted to receive the flared end therein. The flare is made by inserting a mandrel internally adjacent the open end of the pipe, and is held in place by a clamping device to prevent movement of the mandrel, when the flaring head tool is operably attached to the threaded projecting arm and threaded inwardly relative to the arm, causing the head to engage the free open end of the pipe, thereby forcing the end thereof radially outwardly, creating a flared flange of a particular angle. The threaded projecting arm is of suitable length so that as the flaring operation is continued, the end doubles over to form a U. This "doubling over" in combination with suitable fittings provides a much stronger joint than is possible with merely flared pipe.

Thus, the present invention comprises a novel flaring tool which includes a flaring member and a clamp which holds the tube or pipe in a fixed position during the flaring operation, without damage to the plastic pipe or tube and without causing rotational or longitudinal movement of the mandrel disposed in the bore of the pipe. The clamping device includes a pair of clamping bars, one of which is arranged to be fixedly mounted to a substantially stationary fixture; and the other bar is hingedly connected thereto at one end or the other thereof. The fixed bar is fixedly connected to a releasable toggle clamp positioned so that a portion thereof can be forcibly brought to bear against the hingedly connected bar whereby the hinged bar is held in a fixed position with a pipe fixedly held between each bar and disposed in suitable sized, opposing, arcuate, non-semicircular notches. The notches are so formed as to provide a positive engagement between the pipe and the mandrel positioned therein, whereby no movement or rotation of the piping or mandrel is possible when the toggle clamp is engaged.

When the clamping load is applied to the plastic tube or pipe the plastic material is allowed to flow, whereby the tube forms a somewhat egg-shaped or elliptical configuration, without any damage to the surface thereof. The flaring member is then applied to the pipe end over a predetermined distance, preferably using a power drive, so that the pipe flares and when desired, doubles over.

OBJECTS AND ADVANTAGES OF THE INVENTION

The present invention has for an important object to provide a flaring tool for plastic pipes or tubes, generally used in water service, whereby flared and doubled over ends can be formed without causing damage to the pipe or tube.

It is another object of the invention to provide a flaring tool with a mandrel and a clamp for fixedly holding different diameter pipes or tubes, wherein the mandrel is disposed in the pipe during the flaring operation and is held from rotational and longitudinal movement within the pipe or tube by the clamp.

It is still another object of the invention to provide a flaring tool of this character that includes a clamp with notches having an arcuate, non-semicircular configuration so that opposing notches form a general elliptical-shaped opening to allow for distortion of the clamped plastic material.

It is a further object of the invention to provide a tool of this character that is simple and rugged in construction, and has a relatively long working life and can be manually operated.

The characteristics and advantages of the invention are further sufficiently referred to in connection with the accompanying drawings, which represent two embodiments. After considering these examples, skilled persons will understand that variations may be made without departing from the principles disclosed and I contemplate the employment of any structures, arrangements or modes of operation that are properly within the scope of the appended claims.

DESCRIPTION OF THE DRAWINGS

Referring more particularly to the accompanying drawings, which are for illustrative purposes only:

FIG. 4 is a view similar to FIG. 3, showing a tube disposed between the clamping bar prior to a load being placed thereon;

FIG. 5 is an end view of FIG. 4 thereof;

FIG. 6 is a sectional view of the clamping bars, showing the tube and mandrel clamped therebetween;

FIG. 7 is and end view of FIG. 6;

FIG. 8 is an illustration showing the flaring-head member creating a flare on a tube end;

FIG. 9 is an enlarged cross-sectional view of a portion of a flare, indicating the various degrees of the flare;

FIG. 10 is a pictorial view of a second embodiment of the present invention including a mandrel, a flaring head, and a typical pipe;

FIG. 11 is an enlarged cross-sectional view taken along line 11—11 of FIG. 10;

FIG. 12 is an enlarged cross-sectional view taken along line 12—12 of FIG. 11; and FIG. 13 is an enlarged cross-sectional view taken along line 13—13 of FIG. 10.

DESCRIPTION OF THE PREFERRED EMBODIMENT

Figure 1:
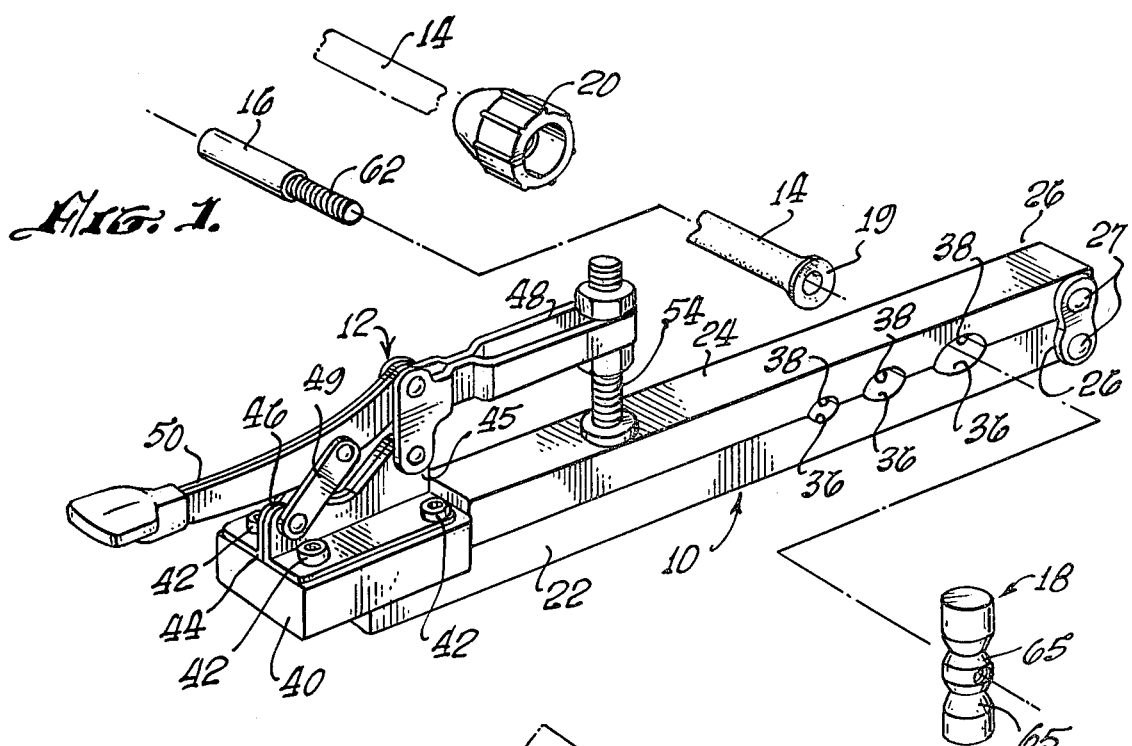
FIG. 1 is a pictorial view of the present invention including the mandrel, flaring head, and a typical pipe-coupling member.

Referring more particularly to FIG. 1, there is shown a clamping-tool device, generally indicated at 10, having secured means in the form of a toggle clamp, indicated at 12.

This allows the pipe or tube 14 to be readily locked into position within the clamping tool, the pipe or tube 14 being of the rigid and flexible thermoplastic construction that is commonly found and employed in water service.

The particular device as herein illustrated is intended to provide a firm securing grip between the clamping members and mandrel 16 which is received in the free open end of the tube 14, the mandrel being adapted to operably receive a flaring-head member 18. The flare 19 formed on the tube's free end is to not only prevent a suitable known female coupling connector, disengaging from the tube, but in addition provides a perfect seal between said female connector 20 and a male connector, not shown.

Accordingly, any well known piping or tubing consisting of various plastics such as polybatylene, polyethylene, polyvinyle, and other related compositions can be provided with standard known compression by forming the proper flared end on the pipe or tube. Hereinafter, in order to simplify the description, the term "pipe" will be employed as including pipes, tubes, and various plastic hoses.

Thus, to create the flare 19 the connector is positioned over the pipe 14; and the mandrel 16 is then inserted in the free end of said pipe to a point therein that will provide the proper diameter flanged flare required for a particular connector. After inserting said mandrel 16, the pipe end together with the mandrel is disposed and locked within the clamping tool.

Figure 2:
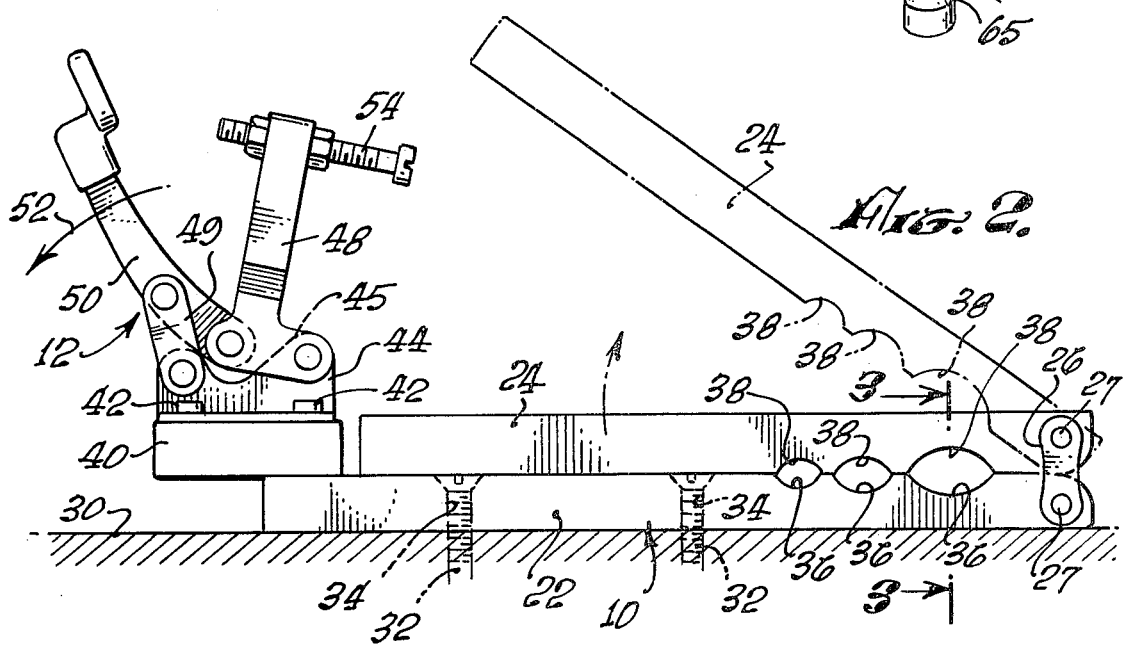
FIG. 2 is a side-elevational view thereof showing the bottom bar fixedly mounted.
Figure 3:
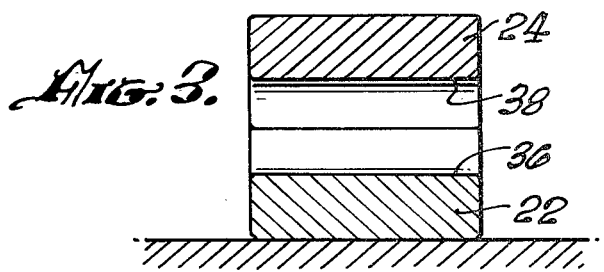
FIG. 3 is an enlarged cross-sectional view taken along line 3—3 of FIG. 2 thereof.

The clamping tool as seen in FIGS. 1 and 2 comprises a pair of clamping bars 22 and 24. Bar 22 is referred to as a substantially fixed bottom bar being hingedly connected to the second bar 24 by a hinge means. Said second bar 24 is free to rotate about the hinge means to allow simple reception of the pipe 14 between each bar member, the hinge means comprising a pair of oppositely disposed link bars 26 and fastening pins 27. See FIG. 2, wherein bar 24 is shown in an open dotted position and bar 22 is illustrated as being secured to a stationary fixture 30 by fastening means represented by screws 32 which are received through opening 34 in bar member 22.

Each bar 22 and 24 includes a plurality of notches 36 and 38, respectively. These notches are of particular interest since they are provided with arcuate, non-semicircular walls. When the bars are clamped together or positioned in a closed mode, the combined adjacent notches 36 and 38 form an oval or elliptical configuration.

Thus, to start the flaring process said pipe 14 together with the mandrel 16 are positioned between bars 22 and 24 and disposed in the proper sized notches for the particular diameter pipe, at which time toggle clamp 12 is clamped into a locking mode. That is, toggle clamp 12 is first raised as seen in FIG. 2; and then lowered and clamped against upper bar 24 as seen in FIG. 1.

To allow the necessary force or applied load between each bar, toggle clamp 12 is secured to the lower bar 22 adjacent the free end thereof, the end opposite to that having the hinge bars 27 connected thereto. Said toggle clamp 12 comprises a base member 40 which is secured directly to bar 22 by suitable screw means 42; which also secures mounting brackets 44 to said base member 40. The brackets 44 include mounting ears 45 and 46 to which a load arm 48 is pivotally connected, the linkage bars 49 being pivotally connected between ears 46 and lever 50. The bar 49 connects to lever 50 midway between its free end and the opposite connected end thereof, the opposite end being connected to load arm 48.

Accordingly, as lever 50 is forced downwardly as shown by arrow 52, the lever 50, provides the necessary load to be applied against bar 24 by means of an adjustable leg 54, said adjustable leg being threadably received in the end of arm 48, whereby the locking force of the toggle clamp is controlled to provide the correct load to a particular diameter pipe.

Referring more particularly to FIGS. 4 and 5, there is illustrated therein the clamping arm 22 and 24 just prior to being forced closed by toggle 12. These views also show how the pipe is received between the notches 36 and 38, respectively. FIGS. 6 and 7 illustrate said bars 22 and 24 in a closed locking position, wherein the pipe 14 is compressed between the arcuate non-circular surfaces of each respective notch 36 and 38. Hence, it can be seen in FIGS. 6 and 7 that the plastic material is compressed against the inner mandrel 16, thereby displacing the annular wall of the pipe laterally outwardly. In the known true circular notches, the distorted areas of the pipe 14a and 14b can become pinched or bruised, causing failure in the pipe and the flanged flare 19.

It should be noted that the free end 60 of the pipe to be flared extends outwardly from the bars 22 and 24. The distance of the extended free end 60 depends on the diameter of the flare required for a particular connector. Thus, in order to form the flare 19, mandrel 16 includes a projecting threaded neck member 62, to which flaring head 18 is threadably received as seen in FIG. 8.

As the flaring head is threaded axially inwardly by crank arm 64, it engages the free end 60 of pipe 14, forming flare 19 by means of oppositely disposed frustro-conical surfaces 65 provided to include an angle up to 113° as indicated in FIG. 9, wherein the prior art has been limited to 45°, the present device having a preferrable 60° angle of flare.

The arrangement of the present invention provides a positive clamping affect to the pipe and mandrel, thereby allowing the flare to be formed without the rotational or longitudinal movement of the pipe or mandrel during the applied force created by the flaring head 18, when said head is moved axially along neck member 62 of said mandrel 16.

FIGS. 10 through 13 show a second embodiment of the clamping tool device 10' and those components thereof similar in function and design to that of the device 10 shown in the prior figures, have been given the same numbers with a prime (') added thereto.

The clamping tool 10' includes a substantial base member 70 which at the opposite ends thereof includes upstanding support portions 72 and 74. Ears 45' and 46' extend along the portion 74 to attach the clamp 12' therebetween by means of welds 76. The opposite upstanding portion 72 provides rear support for a pair of clamping bars 22' and 24' with the back surface 78 of bar 22' being in abutment with the front facing surface 80 of the portion 72. It should be noted that the bars 22' and 24' are hingedly connected by means of a pair of oppositely disposed link bars 26' and suitable fastening pins 27'. It is preferable that the fastening pins 27' be removable. Therefore the link bars 26' can be moved with respect to the bars 22' and 24' so that the leverage thereabout can be adjusted from end to end thereof. For this purpose holes 82 are provided at the opposite ends of the bars 22' and 24' from that end in which the pins 27' are shown inserted.

Each bar 22' or 24' includes a plurality of notches 36' and 38' respectively. The notches are arcuate having non-semicircular walls; that is, their shape may be portions of a circle but when the two bars 22' and 24' are brought together about a pipe 14', they engage it as would an oval or elliptical configuration. The pipe 14' shown both in an engaged and unengaged position is retained between the bars 22' and 24' by the clamp 12'.

The clamp 12' includes a lever 50' capable of being moved in the direction of arrow 52' which moves the adjustable leg 54' thereof in the direction shown by arrow 84 to disengage the bars 22' and 24' or in the opposite directions to clamp up on a pipe 14'. This action occurs because the clamp 12' includes a C-shaped member 86 which is permanently connected to the ears 45' and 46' which at one end includes a sleeve 88 and the opposite end provides for pivotal connection of the lever 50' by means of pivot 90. As the lever 50' is moved in the direction opposite from arrow 52', a second pivot 92 thereof is moved in a circular direction about pivot 90 so that its net linear effect is toward the sleeve 88. The pivot 92 is connected by means of a pair of links 94 and 96 and by a pivot 98 to a shaft member 100 which is mounted to slide axially in the sleeve 88. The adjustable arm 54' is threadably attached to the barrel member 100. The threaded connection provides the length adjustment for the arm 54' so that the desired force can be established on the pipe 14 by the bars 22' and 24', when the lever 50' is manually moved. When the lever 50' is rotated as far as possible downwardly and the arm 54' is properly adjusted, an appropriate force is brought to bear upon the pipe. The downward movement of the lever 50' is restricted by means of abutment surfaces 102, one of which being shown, which bear on mating abutment surfaces 104 on links 94 and 96. The surfaces 102 and 104 are so arranged with respect to the pivots 90 and 92 that the pivot 92 goes through alignment and below a line from pivot 90 to pivot 98 just before the surfaces 102 and 104 come into abutment. This overcenter action causes the lever 50' to remain in a closed position retaining the pipe 14' between the bars 22' and 24'.

The pipe 14 is retained between the bars 22' and 24' with a mandrel 16' thereinside. The mandrel 16' includes an elongated threaded neck member 62' which preferably extends for a substantial distance within the pipe 14' and out the end 60' thereof.

The flaring head member 18' includes a threaded inner bore 106 sized to receive the member 62'. As the flaring head 18' is threaded axially inward, it engages the free end 60' of the pipe 14' forming an elementary flare 110 as shown in FIG. 13. Up to this point the flaring action of the tool 10' is identical to the tool 10' of FIG. 1 since the flaring head member 18' has a flaring shape 65' which is identical to that 65 of flaring head member 18. However, since the threaded neck member 62' is substantially longer than the threaded neck member 62 the flaring head member 18' can continue to flare until the end 60' actually doubles over the pipe 18 to reach the shape 112 shown in FIG. 13. This doubling over action is highly advantageous especially when hot fluids are to flow in the pipe and a suitable connection 20 is provided. To accomplish this doubling over action the threads on the threaded neck member 62' must be relatively fine and it is preferable that the action be accomplished quickly so that the pipe 14' cools only after the doubling over shape 112 has been formed. Therefore the flaring head member 18' includes an axial shaft 114 to adapt the member 18' for connection to power drive means such as the drill motor 116 partially shown.

The invention and its attendant advantages will be understood from the foregoing description and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

I claim:

1. A tool for flaring the free end of plastic pipe and the like including a mandrel adapted to be inserted in the free end of the pipe to be flared and a flaring head operably mounted to the mandrel to engage the free end of the pipe, the improvement comprising:
   a base operatively associated with said mandrel and flaring head and having an upstanding wall surface;
   a first bar member engaging said upstanding wall surface;
   a second bar member hingedly connected to one end of said first bar member;
   removable hinge means operatively associated with said bar members and capable of hingedly connecting either desired pair of adjacent ends of said bar members, whereby said second bar member is adapted to be removably engaged with said first bar member; and clamping means having an overcenter closure maintaining mechanism affixed to said base positioned to bear against said second bar member at a midpoint therealong for releasable engagement thereof with the first bar member, each of said bar members including a plurality of matching transverse notches disposed therein to form pairs which have predetermined non-semicircular arcuate walls sized to accommodate particular size pipes therebetween and to provide positive engagement between said notches and a plastic pipe arranged therein, whereby said mandrel disposed in said pipe is held from rotational and longitudinal movement by compression of said pipe thereon by a pair of said notches.

2. The tool as recited in claim 1 wherein said mandrel includes a threaded portion of a length substantially longer than the diameter of the pipe, the flaring head adapted to threadably engage said mandrel threaded portion and having opposite conical flaring surfaces thereon and a shaft axially aligned with said mandrel threaded portion for engagement with power drive means, whereby a doubled over flare may be produced on the pipe.

3. A releasable clamping and flaring device for plastic tubing and the like comprising:

a base having an upstanding member thereon;

a first bar member having first and second ends, each adapted for engagement with a hinge means and a plurality of various size transverse notches disposed therein and positioned to be restrained in a single direction by said upstanding member;

a second movable bar member having first and second ends, each adapted for engagement with said finge means so that said first means or said second ends of said first and second bar members can be selectively hinged together, said second bar member also having a plurality of transverse notches arranged to correspond to each of said notches in said first bar member, wherein each of said notches include an arcuate non-semicircular wall forming an elliptical opening between respective corresponding notches sized to the diameter of the tubing to provide a positive engagement with the tubing disposed therein;

hinge means hingedly connecting adjacent ends of said bar members, whereby said second bar member is allowed to move relative to said first fixed bar member;

clamping means affixed to said base positioned to bear against said second movable bar member at a midpoint between said first and second ends thereof in said single direction;

at least one mandrel operatively associated with said base and having a threaded neck member formed thereon of a length longer than the smallest span of said corresponding notches in conjunction with which the mandrel is to be used; and a flaring head member threadably received on said neck member of said mandrel so as to move longitudinally inwardly along the axis of said mandrel a distance greater than the smallest span of said corresponding notches in use so that a doubled over flare can be formed on the tubing.

* * * * *